US012576939B2

(12) United States Patent
Su et al.

(10) Patent No.: US 12,576,939 B2
(45) Date of Patent: Mar. 17, 2026

(54) FRONT FORKS FOR BICYCLES

(71) Applicant: SRAM, LLC, Chicago, IL (US)

(72) Inventors: Chi Hui Su, Taichung City (TW);
Hong Chou Lee, Taichung City (TW);
Chu Chen Wang, Taichung City (TW);
En-Chieh Chen, Taichung City (TW)

(73) Assignee: SRAM, LLC, Chicago, IL (US)

( * ) Notice: Subject to any disclaimer, the term of this patent is extended or adjusted under 35 U.S.C. 154(b) by 654 days.

(21) Appl. No.: 17/975,836

(22) Filed: Oct. 28, 2022

(65) Prior Publication Data

US 2024/0140554 A1      May 2, 2024

(51) Int. Cl.
*B62K 21/04*        (2006.01)
(52) U.S. Cl.
CPC .................................... *B62K 21/04* (2013.01)
(58) Field of Classification Search
CPC ...................................................... B62K 21/02
See application file for complete search history.

(56) References Cited

U.S. PATENT DOCUMENTS

| | | | |
|---|---|---|---|
| 2,160,039 A | 5/1939 | Singer | |
| 3,831,979 A | 8/1974 | Baginski | |
| 3,910,600 A * | 10/1975 | Sprick | B62K 21/04 |
| | | | 280/280 |
| 5,273,301 A | 12/1993 | Klein | |
| 7,503,576 B1 | 3/2009 | Schroeder | |
| 7,993,575 B2 | 8/2011 | Megastir | |
| 10,744,602 B2 | 8/2020 | Becker et al. | |
| 12,330,739 B2 * | 6/2025 | Brown, IV | B62K 21/04 |
| 2005/0116012 A1 | 6/2005 | Packer et al. | |

FOREIGN PATENT DOCUMENTS

CN            1064613 C      4/2001

* cited by examiner

*Primary Examiner* — Kevin Hurley

(57)            ABSTRACT

Example front forks for bicycles are described herein. An example front fork includes a crown having a top side and a bottom side opposite the top side. The crown defines an opening between the top side and the bottom side. The front fork includes a first leg and a second leg coupled to and extending from the bottom side of the crown. The front fork also includes a steerer tube disposed in the opening of the crown and extending from the top side of the crown. The steerer tube and the crown coupled by a weld at or near the bottom side of the crown.

20 Claims, 14 Drawing Sheets

FRONT FORKS FOR BICYCLES

FIELD OF THE DISCLOSURE

This disclosure relates generally to bicycle components and, more specifically, to front forks for bicycles.

BACKGROUND

Bicycles are known to have font forks. A front fork typically includes a steerer tube, a crown, and first and second legs. The first and second legs extend downward from the crown and are coupled to the hub or axle of the front wheel. The steerer tube extends upward from the crown and is coupled to the handlebars. Therefore, when the rider turns the handlebars, the front fork turns the front wheel.

SUMMARY

An example front fork for a bicycle disclosed herein includes a crown having a top side and a bottom side opposite the top side. The crown defines an opening between the top side and the bottom side. The front fork includes a first leg and a second leg coupled to and extending from the bottom side of the crown. The front fork also includes a steerer tube disposed in the opening of the crown and extending from the top side of the crown. The steerer tube and the crown coupled by a weld at or near the bottom side of the crown. The weld is formed by a solid-state welding process.

An example front fork for a bicycle disclosed herein includes a crown having a top side, a bottom side opposite the top side, and an opening extending between the top side and the bottom side. The front fork also includes one or more legs coupled to and extending from the bottom side of the crown and a steerer tube disposed in the opening of the crown. The steerer tube has an end portion extending outward from the bottom side. The end portion is welded to the bottom side of the crown.

An example method of assembling a front fork for a bicycle disclosed herein includes coupling first and second legs to a bottom side of a crown. The crown has a top side opposite the bottom side. The crown defines an opening between the top side and the bottom side. The method also includes inserting a steerer tube into the opening in the crown and welding the steerer tube and the crown using a solid-state welding process.

BRIEF DESCRIPTION OF THE DRAWINGS

FIG. 16 also shows an example friction stir welding tool that can be used to weld the example steerer tube and the example crown.

FIG. 18 also shows an example friction stir welding tool that can be used to weld the example steerer tube and the example crown.

FIG. 20 also shows an example friction stir welding tool that can be used to weld the example steerer tube and the example crown.

The figures are not to scale. Instead, the thickness of the layers or regions may be enlarged in the drawings. In general, the same reference numbers will be used throughout the drawing(s) and accompanying written description to refer to the same or like parts.

Figure 1:
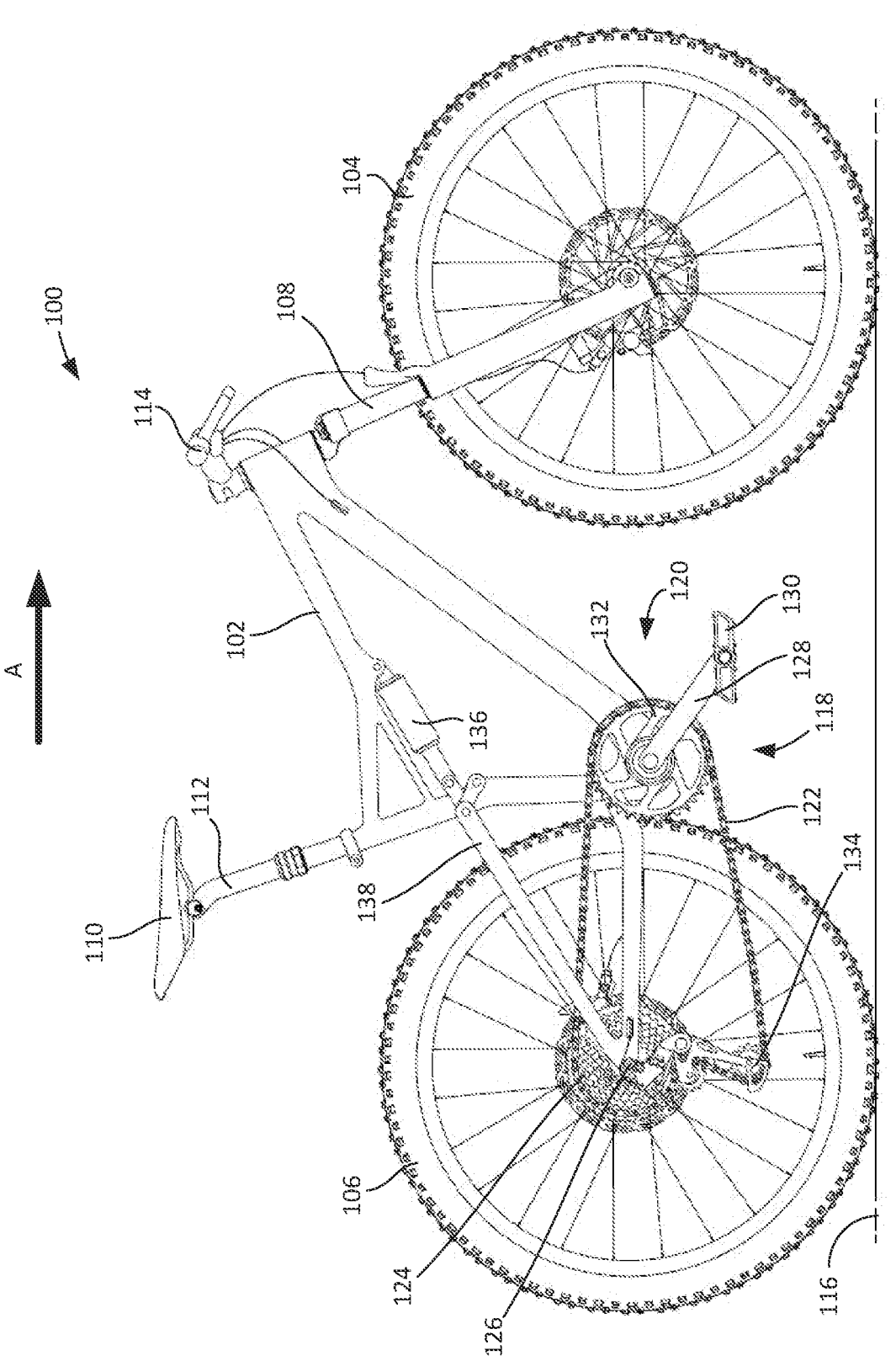
FIG. 1 is a side view of an example bicycle that can employ example front forks disclosed herein.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are example front forks for bicycles that include a steerer tube and a crown that are coupled by a welding process, such as a solid-state welding process. Welding the steerer tube and the crown eliminates the need to couple the component by press fitting. Press fitting leads to unpredictable deformation of the components because the high forces needed for press fitting often cause twisting or bending of these structural components. Instead, in the example front forks disclosed herein, the fit between the steerer tube and the crown can be a transition fit (sometimes referred to as a slip fit), which requires little or no pressing forces that would twist or bend the crown. Therefore, the example front forks disclosed herein can have more precise dimensions and be manufactured and/or assembled with more predictability. The example front forks disclosed herein are also easier to manufacture and/or assemble than known front forks, which results in shortened manufacturing time and lower costs.

An example front fork of a bicycle disclosed herein includes a steerer tube, a crown, and first and second legs. The crown has a top side and a bottom side opposite the top side. The first and second legs are coupled to the crown and extend downward from the bottom side of the crown. For example, the crown may have two downward facing bores that the first and second legs can be inserted into and coupled to the crown (e.g., via a threaded connection). The distal ends of the first and second legs can be coupled to the front wheel of the bicycle by an axle. The steerer tube is coupled to the crown and extends upward from the top side of the crown. The crown also defines a central channel or opening that extends between the top and bottoms sides. A bottom portion of the steerer tube is disposed in the opening, such that the steerer tube extends upward from the top side of the crown opposite the legs. A top or distal portion of the steerer tube can be coupled to the handlebars of the bicycle. The steerer tube is to be non-rotatably coupled to the crown. As such, when a rider turns the handlebars, the steerer tube rotates the crown to turn the front wheel.

In general, it is often desired for the steerer tube and the two legs to be parallel to each other. Therefore, the components of the fork are typically manufactured according to calculations from tolerance analysis. However, known assembly techniques often result in arrangements where the steerer tube and the legs are not parallel to each other and/or where certain deformation of the components occurs in the process of trying to assemble and align the components. For instance, in some known assembly techniques, the steerer tube is inserted into the opening in the crown from the bottom side and press fit into the opening by holding the ends of the crown. However, during the press fit operation, high pressing forces cause the crown to bend or deform, which pulls the first and second legs toward or away from each other. Therefore, with this process, it is difficult to control the final alignment of the steerer tube and the legs in a predictable manner. Further, this process can deform the crown, which can induce permanent stresses in the crown that can adversely affect the components.

Disclosed herein are example front forks having a steerer tube and a crown that are at least partially coupled by a weld formed by a welding process. By welding the steerer tube and the crown, the steerer tube does not need to press fit into the crown. Instead, the steerer tube and the crown can be dimensioned to form a transition fit or slip fit, which imparts little or no bending forces to the parts during assembly. This results in a more predictable alignment and assembly of the steerer tube, crown, and legs. This also reduces or eliminates pressing forces that tend to twist or bend the crown. Thus, less stress is imparted to the crown during assembly.

In some examples disclosed herein, the steerer tube and the crown are welded at a joint located at or near the bottom side of the crown. As used herein, the term "near the bottom side" means a location that is closer to the bottom side of the crown than the top side of the crown. In some examples disclosed herein, the steerer tube is flush mounted to the opening of the crown. For example, when the steerer tube is inserted into the opening of the crown, a bottom tip or end surface of the steerer tube is aligned with the bottom side of the crown around the opening. In some examples, the steerer tube and/or the opening include one or more features (e.g., a shoulder, a flange) to align the bottom end surface of the steerer tube and the bottom side of the crown. The joint formed between the bottom end surface of the steerer tube and the bottom side of the crown can be welded to couple the steerer tube and the crown.

In other examples disclosed herein, the steerer tube is surface mounted to the opening of the crown. For example, when the steerer tube is inserted into the opening of the crown, an end portion of the steerer tube extends outward from the bottom side of the opening. The end portion can be welded to the bottom side of the crown to couple the steerer tube and the crown. In some examples, the end portion of the steerer tube has a flange that extends radially outward and is engaged with the bottom side of the crown. In such an example, the weld can be formed through the flange and into the bottom side of the crown. Additionally or alternatively, in other examples, the steerer tube and the crown can be welded at other locations, such as location within the opening between the top and bottom sides of the crown.

In some examples, the weld is formed by a solid-state welding process or operation. Solid-state welding is a category of welding processes that produces coalescence at temperatures below the melting point of the base materials being joined, and without the addition of a filler material. Therefore, solid-state welding does not require melting materials or using a consumable as seen in traditional fusion welding processes such as MIG welding, TIG welding, and stick welding.

One example type of solid-state welding that can be used to weld the steerer tube and the crown is friction stir welding (also referred to herein as FSW). Friction stir welding is a process that uses a non-consumable tool to join two metal pieces without melting the material of the metal pieces. The tool has a probe (sometimes referred to as a pin or bit) extending from a shoulder. The tool is rotated up to a relatively high speed and pushed into a joint of the metal pieces until the probe pierces into the metal pieces and the shoulder touches the surface of the metal pieces. Heat is generated by friction between the rotating tool and the two metal pieces, which leads to a softened region near the tool. This heat, in addition to the heat generated by the mechanical mixing process and the adiabatic heat within the material, causes the stirred materials to soften without melting. The tool is moved along the joint line, which mechanically intermixes the two metal pieces at the joint. This forges the hot and softened metal by the mechanical pressure that is applied by shoulder of the tool. Upon cooling, a solid phase weld or bond is created between the metal pieces. Therefore, unlike traditional fusion welding (such as MIG or TIG), friction stir welding does not require a consumable and does not add additional material to the joint. Instead, friction stir welding merely mixes and forges the material of the two metal pieces that is present at the joint. Therefore, the weld is composed only of material from the two components. The resulting weld forms a strong bond that mechanically couples the two metal pieces. Further, friction stir welding does not reach temperatures above the melting points of the metals.

Friction stir welding has many advantages over traditional fusion welding. For example, friction stir welding: does not require filler wire or shielding gas; is safer because of absence of toxic fumes and molten splatter; can be easily automated on simple machines, which results in lower operational costs and less training; produces a clean weld appearance; can be applied in any orientation (e.g., upside-down); has low environmental impact; is largely defect free with no hot cracking, porosity or solidification cracks; and has little or no cool-down period because of reduced temperatures. Also, friction stir welding can be used to join two pieces with the same composition (e.g., aluminum and aluminum) or dissimilar compositions (e.g., steel and aluminum). Therefore, the steerer tube and the crown can be constructed of the same type of material (e.g., steel and steel) or different types of material (e.g., steel and aluminum). While friction stir welding is one example type of solid-state welding that can be used to weld the steerer tube and crown, in other examples, other type of solid-state welding can be used, such as friction stir spot welding or spin welding.

Turning now to the figures, FIG. 1 illustrates one example of a human powered vehicle on which the example front forks disclosed herein may be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. A front and/or forward riding direction or orientation of the bicycle 100 is indicated by the direction of the arrow A in FIG. 1. As such, a forward direction of movement for the bicycle 100 is indicated by the direction of arrow A.

In the illustrated example of FIG. 1, the bicycle 100 includes a seat 110 coupled to the frame 102 (e.g., near the rear end of the frame 102 relative to the forward direction A) via a seat post 112. The bicycle 100 also includes handlebars 114 coupled to the front fork 108 (e.g., near a forward end of the frame 102 relative to the forward direction A) for steering the bicycle 100. The bicycle 100 is shown on a riding surface 116. The riding surface 116 may be any riding surface such as the ground (e.g., a dirt path, a sidewalk, a street, etc.), a man-made structure above the ground (e.g., a wooden ramp), and/or any other surface.

In the illustrated example, the bicycle 100 has a drivetrain 118 that includes a crank assembly 120. The crank assembly 120 is operatively coupled via a chain 122 to a sprocket assembly 124 mounted to a hub 126 of the rear wheel 106. The crank assembly 120 includes at least one, and typically two, crank arms 128 and pedals 130, along with at least one front sprocket, or chainring 132. A rear gear change device 134, such as a derailleur, is disposed at the rear wheel 106 to move the chain 122 through different sprockets of the sprocket assembly 124. Additionally or alternatively, the bicycle 100 may include a front gear change device to move the chain 122 through gears on the chainring 132.

The example bicycle 100 can include a suspension system having one or more suspension components. For example, the front fork 108 can be implemented as a front suspension component that integrates a spring and/or a damper. Further, in the illustrated example, the bicycle 100 includes a rear suspension component 136, which is a shock absorber, referred to herein as the rear shock absorber 136. The rear shock absorber 136 is coupled between two portions of the frame 102, including a swing arm 138 coupled to the rear wheel 106. The front fork 108 and the rear shock absorber 136 absorb shocks and vibrations while riding the bicycle 100 (e.g., when riding over rough terrain). In other examples, the front fork 108 and/or the rear shock absorber 136 may be integrated into the bicycle 100 in other configurations or arrangements. Further, in other examples, the suspension system may employ only one suspension component (e.g., only the front fork 108) or more than two suspension components (e.g., an additional suspension component on the seat post 112) in addition to or as an alternative to the front fork 108 and rear shock absorber 136.

While the example bicycle 100 depicted in FIG. 1 is a type of mountain bicycle, the example front forks disclosed herein can be implemented on other types of bicycles. For example, the disclosed front forks may be used on road bicycles, as well as bicycles with mechanical (e.g., cable, hydraulic, pneumatic, etc.) and non-mechanical (e.g., wired, wireless) drive systems. The disclosed front forks can also be implemented on other types of two-wheeled, three-wheeled, and four-wheeled human powered vehicles. Further, the example front forks can be used on other types of vehicles, such as motorized vehicles (e.g., a motorcycle).

Figures 2, 3:
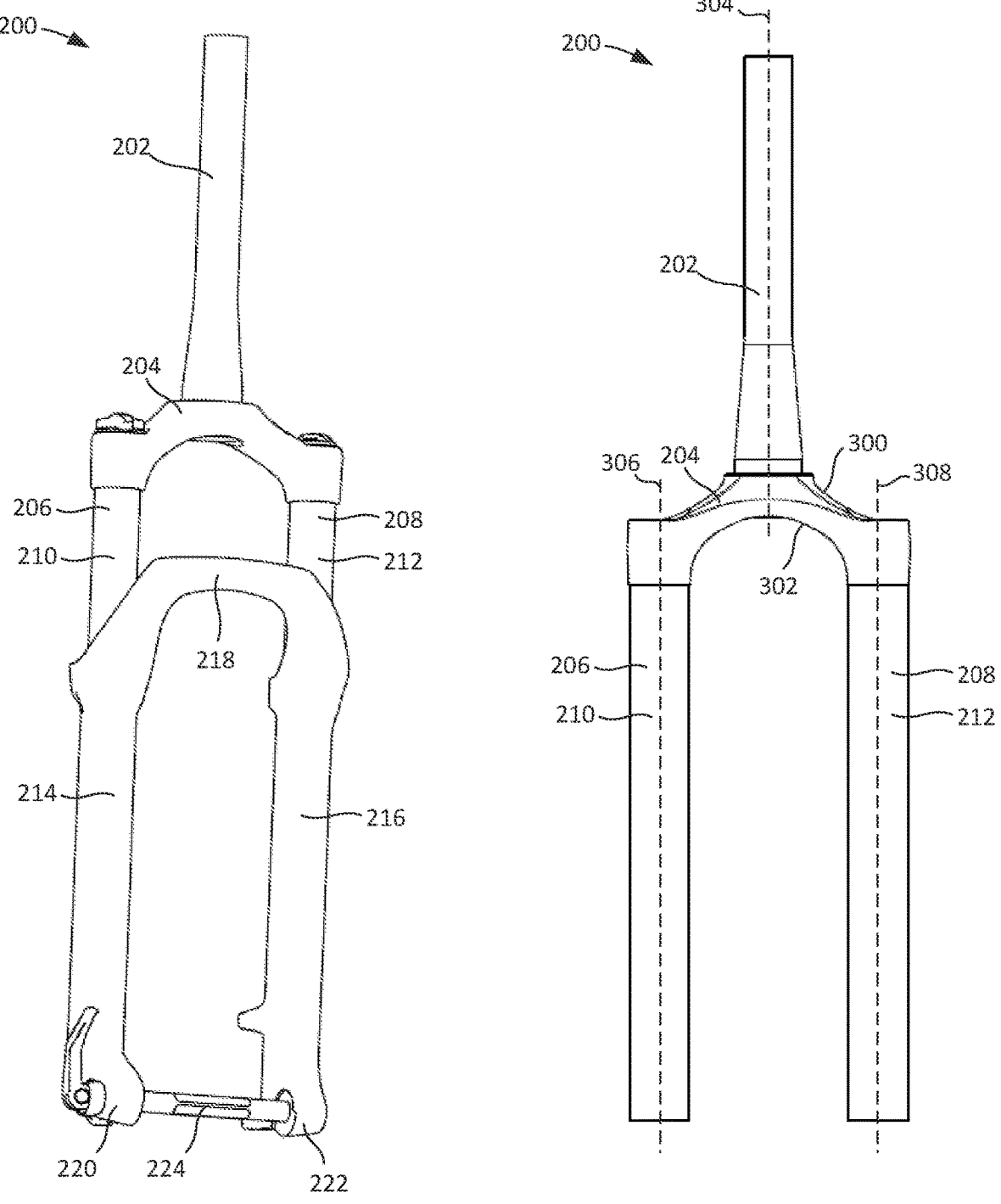
FIG. 2 is a perspective view of an example front fork that can be implemented on the example bicycle of FIG. 1.
FIG. 3 is a front view of the example front fork of FIG. 2 with an example lower tube assembly removed.

FIG. 2 is a perspective view of an example front fork 200 (referred to herein as the fork 200) that can be implemented as the front fork 108 on the bicycle 100 of FIG. 1. In the illustrated example, the fork 200 includes a steerer tube 202, a crown 204, a first leg 206, and a second leg 208. As shown in FIG. 2, the steerer tube 202 is coupled to and extends upward from the crown 204, and the first and second legs 206, 208 are coupled to and extend downward from the crown 204 opposite the steerer tube 202. When the fork 200 is installed on the bicycle 100, the steerer tube 202 extends through an opening in the frame 102 (referred to as head tube), and the handlebars 114 are coupled (e.g., bolted) to the top end of the steerer tube 202. The steerer tube 202 is to be coupled to the crown 204 in a non-rotatable manner. As such, when a rider turns the handlebars, the steerer tube 202 rotates the crown 204 to turn the front wheel 104 (FIG. 1). Example techniques for coupling the steerer tube 202 and the crown 204 are disclosed in further detail herein. In some examples, the steerer tube 202 and the crown 204 are constructed of the same type of material. For example, the steerer tube 202 and the crown 204 can be constructed of metal, such as aluminum, steel, or stainless steel. In other examples, the steerer tube 202 and the crown 204 can be constructed of different materials.

In this example, the fork 200 is a suspension fork that includes telescoping legs. For example, as shown in FIG. 2, the first and second legs 206, 208 include first and second upper tubes 210, 212 (sometimes referred to as leg portions or stanchions), respectively, and first and second lower tubes 214, 216 (sometimes referred to as leg portions or lowers), respectively. The first and second upper tubes 210, 212 may be collectively referred to as an upper tube assembly, and the first and second lower tubes 214, 216 may be collectively referred to as a lower tube assembly. The first and second upper tubes 210, 212 are coupled to and extend from the crown 204. In some examples, the first and second lower tubes 214, 216 are coupled via an arch 218 (sometimes referred to as a fork brace or stabilizer). The first and second lower tubes 214, 216 include respective front wheel attachment portions 220, 222, such as holes (e.g., eyelets) or dropouts, for attaching the front wheel 104 (FIG. 1) to the fork 200. FIG. 2 shows an example axle 224 that extends through a hub of the front wheel 104 (FIG. 1). The first and second upper tubes 210, 212 are slidably received within the respective first and second lower tubes 214, 216. Thus, the first and second upper tubes 210, 212 form a telescopic arrangement with the respective first and second lower tubes 214, 216. In some examples, a spring (e.g., an air spring) is disposed in one of the legs 206, 208 and a damper is disposed in the other one of the legs 206, 208. The spring and damper control the movement of the first and second lower tubes 214, 216 relative to the first and second upper tubes 210, 212 to absorb impacts and vibrations. During a compression stroke, the first and second upper tubes 210, 212 move into or toward the respective first and second lower tubes 214, 216, and during a rebound stroke, the first and second upper tubes 210, 212 move out of or away from the respective first and second lower tubes 214, 216.

FIG. 3 is a front view of the example fork 200 without the lower tube assembly. The crown 204 has a first side 300 and a second side 302 opposite the first side 300. The first and second sides 300, 302 are referred to herein as the top and bottom sides 300, 302 because when the fork 200 is installed on the bicycle 100 the first side 300 generally faces upward and the second side 302 generally faces downward. However, it is understood that the fork 200 can be installed in other orientations in which the first and second sides 300, 302 can face other directions. In the orientation shown in FIG. 3, the steerer tube 202 is coupled to the crown 204 and extends upward from the top side 300 of the crown 204, and the first and second upper tubes 210, 212 of the first and second legs 206, 208 are coupled to and extend downward from the bottom side 302 of the crown 204. The steerer tube 202 has a central axis 304, and the first and second legs 206, 210 have respective central axes 306, 308. The steerer tube 202 and the first and second legs 206, 208 are coupled to the crown 204 such that the three axes 304, 306, 308 are parallel to each other. As disclosed in further detail herein, the example welding techniques disclosed herein enable the steerer tube 202 to be inserted into the crown 204 via a transition fit or clearance fit. This reduces or eliminates forces that may otherwise cause the axes 304, 306, 308 to bend away from their parallel arrangement.

Figure 4:
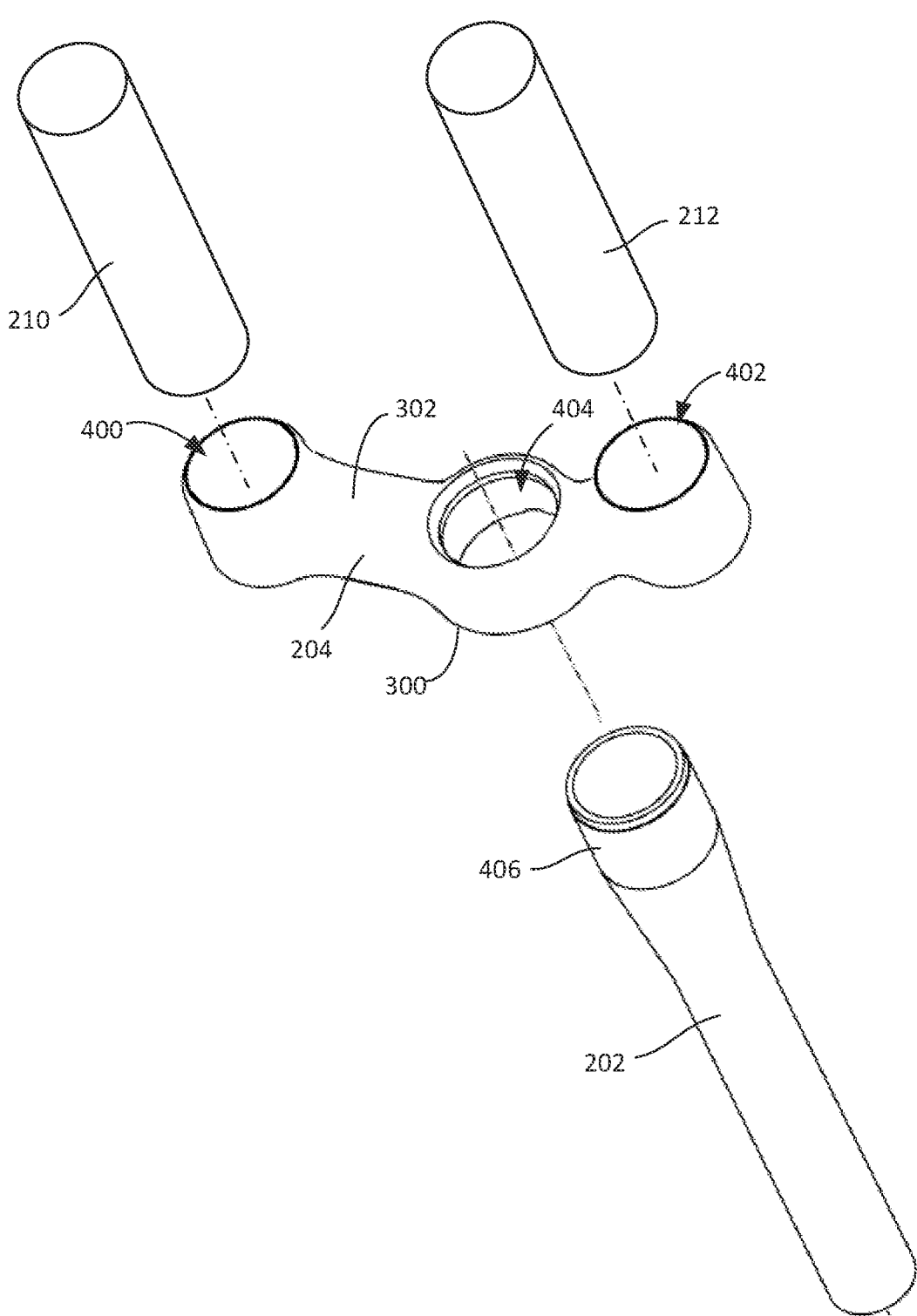
FIG. 4 is an exploded view of the example front fork of FIG. 3.

FIG. 4 shows an exploded view of the steerer tube 202, the crown 204, and the first and second upper tubes 210, 212. In the illustrated example, the crown 204 has first and second bores 400, 402 formed in the bottom side 302 (and in some examples can extend through to the top side 300). During assembly, the first and second upper tubes 210, 212 are inserted into the first and second bores 400, 402 and coupled to the crown 204. In some examples, the first and second upper tubes 210, 212 are threadably coupled to the crown 204. In other examples, the first and second upper tubes 210, 212 and the first and second bores 400, 402 are sized to form a friction fit or press fit when the first and second upper tubes 210, 212 are inserted into the respective first and second bores 400, 402.

In the illustrated example of FIG. 4, the crown 204 defines a channel or opening 404 that extends through the crown 204 between the top side 300 and the bottom side 302 to receive the steerer tube 202. The opening 404 is typically spaced equidistant between the bores 400, 402 for the legs. During assembly, a bottom portion 406 of the steerer tube 202 is inserted into the opening 404 and coupled to the crown 204. In this example, the bottom portion 406 of the steerer tube 202 is inserted into the opening 404 from the top side 300 of the crown 204. In other examples disclosed herein, the steerer tube 202 can be inserted into the opening 404 from the bottom side 302 of the crown 204.

Figure 5:
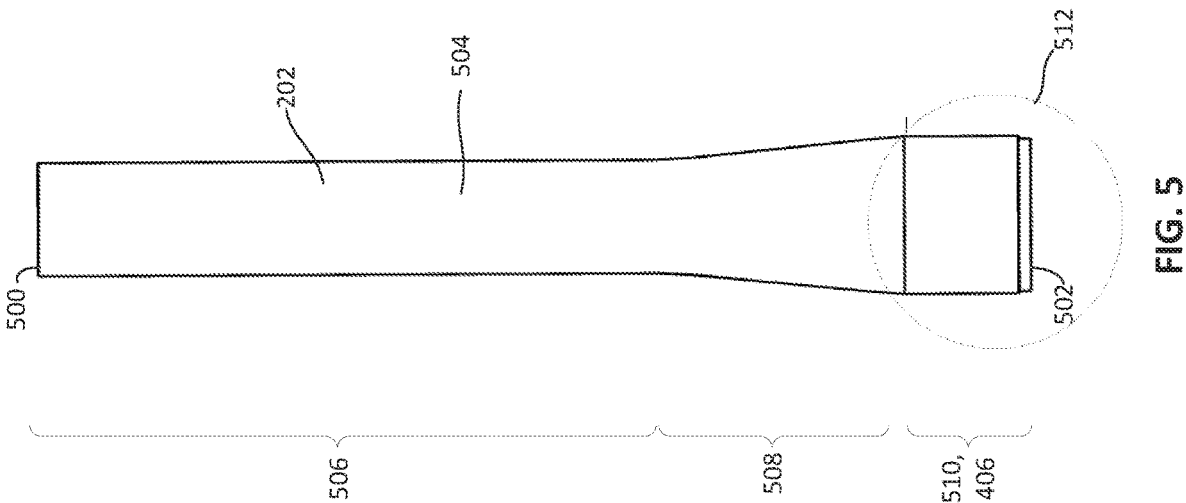
FIG. 5 is a side view of an example steerer tube of the example front fork of FIGS. 2-4.

FIG. 5 is a side view of the steerer tube 202. The steerer tube 202 has a top end surface 500, a bottom end surface 502 opposite the top end surface 500, and an outer side surface 504 between the top end surface 500 and the bottom end surface 502. In the illustrated example, the steerer tube 202 has a varied diameter. For example, the steerer tube 202 has a first portion 506, a second portion 508, and a third portion 510. The third portion 510 corresponds the bottom portion 406. In this example, the third portion 510 has a larger diameter than the first portion 506. The second portion 508 tapers in diameter between the first portion 506 and the third portion 510. In other examples, the first, second, and/or third portions 506, 508, 510 can have different diameters, or the steerer tube 202 may have a constant diameter.

Figure 6:
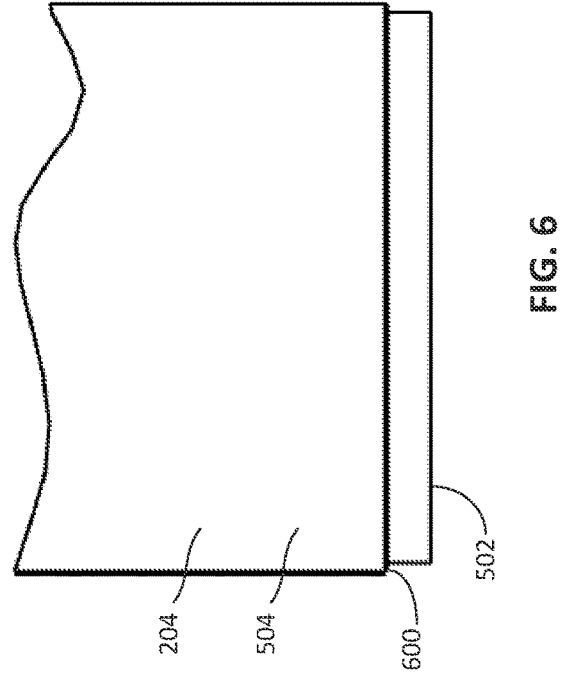
FIG. 6 is an enlarged view of the example callout of FIG. 5.

FIG. 6 is an enlarged view of the bottom portion 406 (the third portion 510) of the steerer tube 202 from the callout 512 in FIG. 5. As shown in FIG. 6, the outer side surface 504 of the steerer tube 202 has a first shoulder 600, which is formed by an indented or recessed portion near the bottom end surface 502. In this example, the first shoulder 600 is parallel to the bottom end surface 502. The first shoulder 600 is used to engage a corresponding shoulder in the crown 204, as shown in further detail herein.

Figures 7, 8:
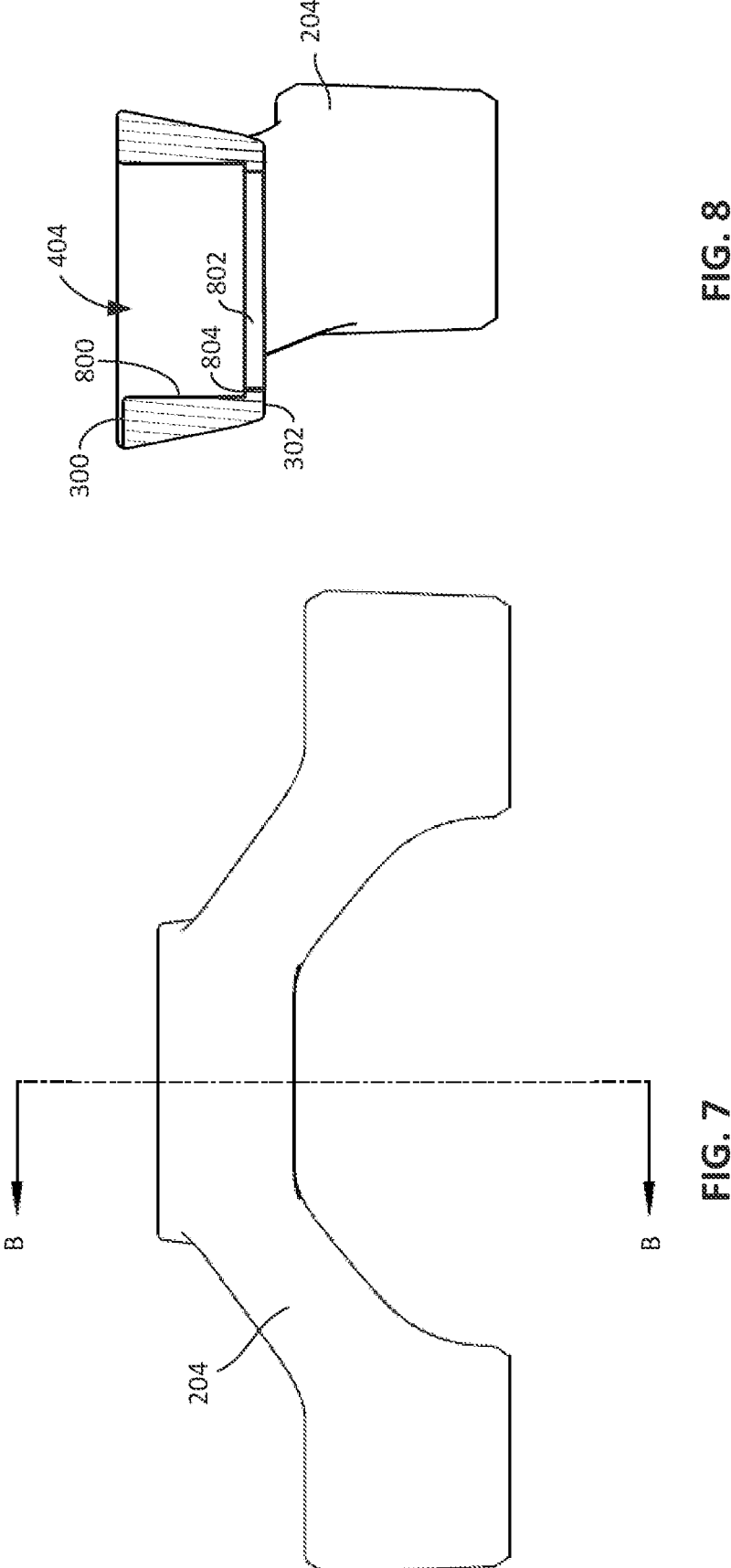
FIG. 7 is a front view of an example crown of the example front fork of FIGS. 2-4.
FIG. 8 is a cross-sectional view of the example crown taken along line B-B of FIG. 7.

FIG. 7 is a front view of the example crown 204. FIG. 8 is a cross-sectional view of the crown 204 taken along line B-B of FIG. 7. As shown in FIG. 8, the opening 404 extends through the crown 204 between the top side 300 and the bottom side 302. The opening 404 is defined by an inner surface 800 of the crown 204. In the illustrated example, the inner surface 800 has a ridge 802 extending radially inward at the bottom side 302. The ridge 802 forms a second shoulder 804. In this example, the second shoulder 804 is parallel to the first shoulder 600 (FIG. 6).

Figure 9:
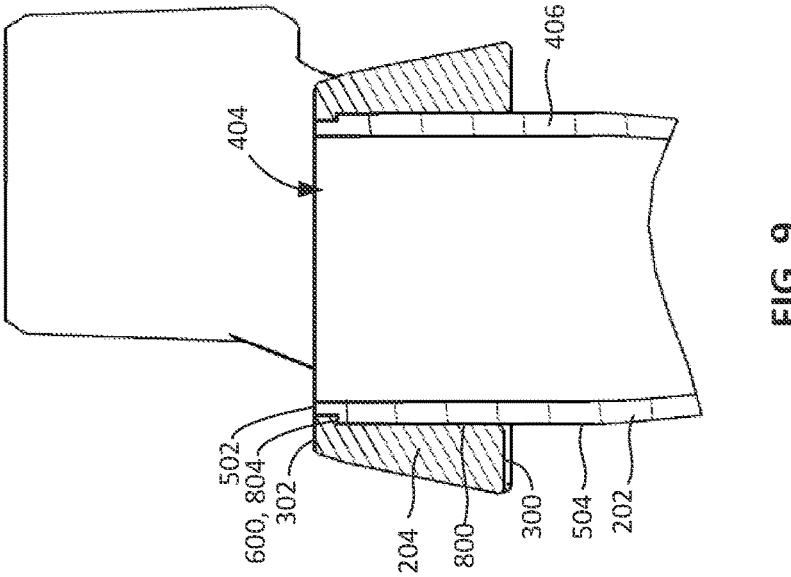
FIG. 9 is a cross-sectional view of the steerer tube of FIGS. 5 and 6 inserted into the example crown of FIGS. 7 and 8 and forming an example flush mount joint.

FIG. 9 is a cross-sectional view showing the steerer tube 202 inserted into the opening 404 of the crown 204. In FIG. 9, the steerer tube 202 and the crown 204 are shown in an upside-down orientation. As shown in FIG. 9, the bottom portion 406 of the steerer tube is disposed in the opening 404. In this example, the steerer tube 202 is inserted into the opening 404 from the top side 300 of the crown 204. In some examples, the steerer tube 202 and the opening 404 are dimensioned such that the outer side surface 504 of the steerer tube 202 and the inner surface 800 of the crown 204 are in contact. In some examples, the steerer tube 202 and the opening 404 are dimensioned to form a transition fit (sometimes referred to as a slip fit), which at least partially holds the steerer tube 202 in the opening 404 and couples the steerer tube 202 and the crown 204. In other examples, the steerer tube 202 and the opening 404 can be dimensioned to form a clearance fit.

As shown in FIG. 9, the first shoulder 600 of the steerer tube 202 is engaged with the second shoulder 804 of the ridge 802 of the crown 204. In the illustrated example, the distance between the first shoulder 600 and the bottom side 302 of the crown 204 is the same as the distance between the second shoulder 804 and the bottom end surface 502 of the steerer tube 202. As such, the bottom end surface 502 of the steerer tube 202 is aligned (e.g., flush) with the bottom side 302 of the crown 204. As disclosed in further detail herein, a weld can be formed at the joint between these two surfaces to couple the steerer tube 202 and the crown 204. Therefore, in this example, the steerer tube 202 and the crown 204 are flush mounted.

Figure 10:
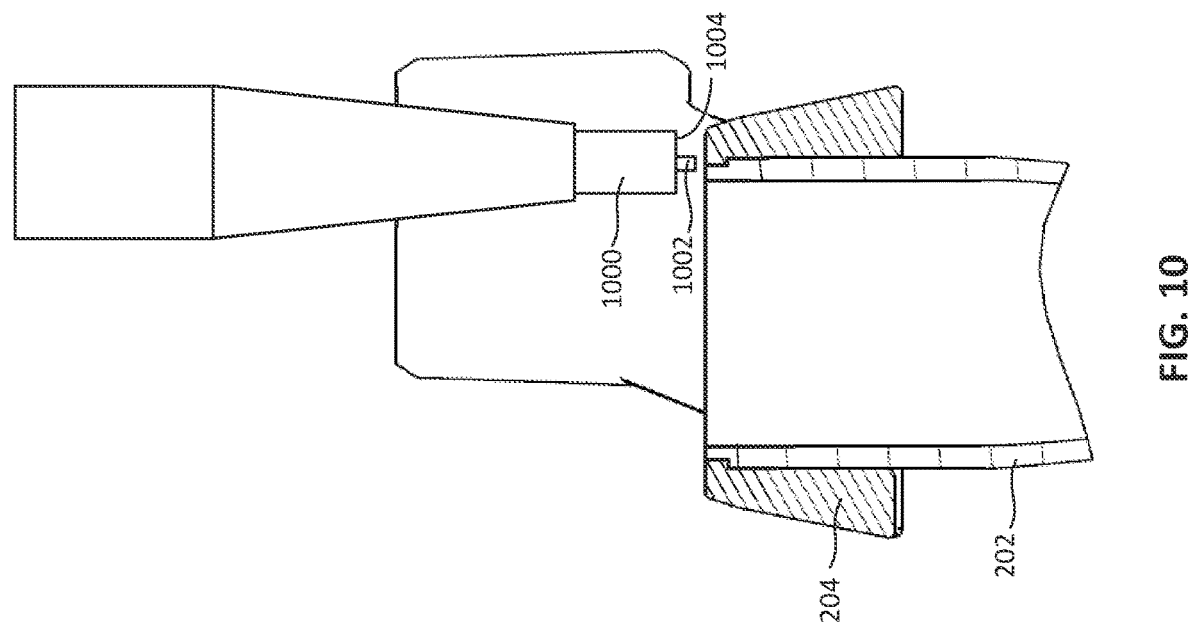
FIG. 10 shows an example friction stir welding tool that can be used to weld the example steerer tube and the example crown of FIG. 9.
Figures 11, 12, 13:
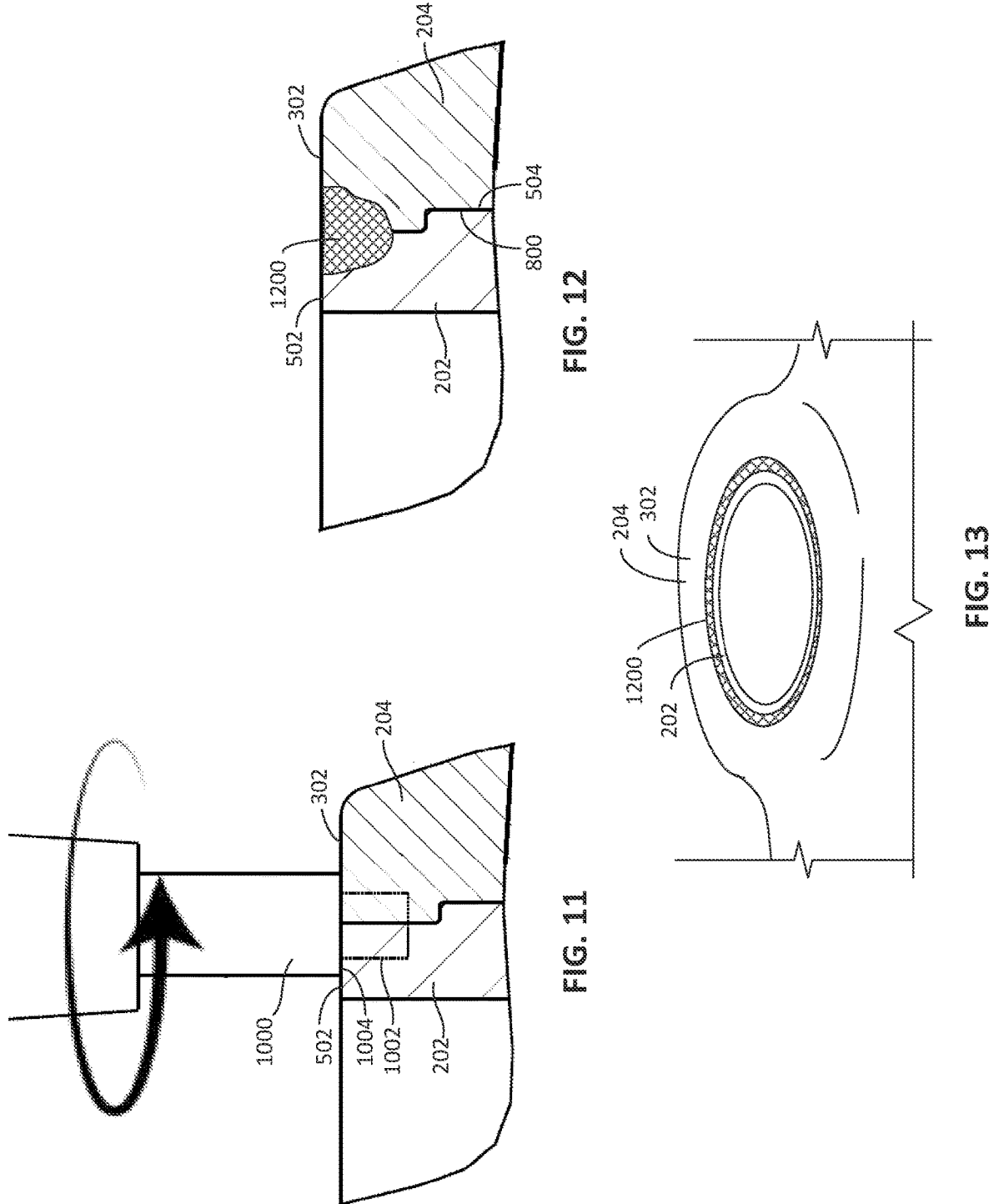
FIG. 11 shows the example friction stir welding tool of FIG. 10 inserted into an example joint formed between the example steerer tube and the example crown during an example welding process.
FIG. 12 shows an example weld created by the example friction stir welding tool of FIGS. 10 and 11.
FIG. 13 is a perspective view of a bottom side of the example crown of FIG. 12 showing the example weld.

FIG. 10 shows an example friction weld stirring (FSW) tool 1000 that can be used to form a weld to couple the steerer tube 202 and the crown 204. The FSW tool 1000 has a probe 1002 (sometimes referred to as a tip or bit) extending from a shoulder 1004. The FSW tool 1000 can be part of an automated machine or a handheld tool. As shown in FIG. 11, the FSW 1000 is rotated up to a relatively high speed and pushed into the joint formed between the bottom end surface 502 of the steerer tube 202 and the lower surface 806 of the crown 204. The probe 1002 pierces or drills into the joint, and the shoulder 1004 engages and applies pressure on surfaces 302, 502. In some examples, a pilot hole can be pre-drilled into the joint to help ensure the probe 1002 is centered. The high speed rotation of the probe 1002 generates high temperatures (but still below the melting point of the metals). This high speed rotation and high temperatures fuses or mixes the material of the steerer tube 202 and the crown 204 at the joint. The FSW tool 1000 is moved in a circular path along the joint and then removed from the joint. This process forms a weld at the joint that couples the steerer tube 202 and the crown 204. Various parameters of the FSW tool 1000 can be changed to affect (e.g., optimize) the weld, such as the profile of the probe 1002, the material of the probe 1002, the length and/or width of the probe 1002, the speed of rotation of the FSW tool 100, the speed that the FSW tool 1000 travels, and/or the pressure applied by the shoulder 1004.

FIG. 12 shows an example weld 1200 left by the FSW process after the FSW tool 1000 has been removed. As shown in FIG. 12, the weld 1200 is formed at the joint between the bottom end surface 502 of the steerer tube 202 and the bottom side 302 of the crown 204 (and between the outer side surface 504 for the steerer tube the inner surface 800 of the crown 204), thereby coupling the steerer tube 202 and the crown 204. The weld 1200 is composed only of material from the steerer tube 202 and material from the crown 204. FIG. 13 is a perspective view of the bottom side 302 of the crown 204 showing the weld 1200 between the steerer tube 202 and the crown 204. In some examples, one or more machining operations (e.g., grinding) can be performed to smooth the weld 1200. In some examples, the steerer tube 202 and the crown 204 are constructed of the same type of material, such as steel. In other examples, the steerer tube 202 and the crown 204 can be constructed of different materials. For example, one of the steerer tube 202 and the crown 204 can be constructed of aluminum and the other one of the steerer tube 202 and the crown 204 can be constructed of steel. Thus, friction stir welding enables the steerer tube 202 and the crown 204 to be constructed of different materials and still welded together.

In some examples, an additional component can be added to the fork 108 and used for the start and/or end of the FSW process. In particular, in some instances, when the probe 1002 is first inserted into the material, there is a period of time while the probe 1002 warms up and starts to mix the material before the probe 1002 can be moved. Further, in some instances, a small hole is left where the probe 1002 is removed and the end of the process. Therefore, the additional component can be used as a sacrificial component for the starting and/or ending processes of the FSW process.

Figures 14, 15:
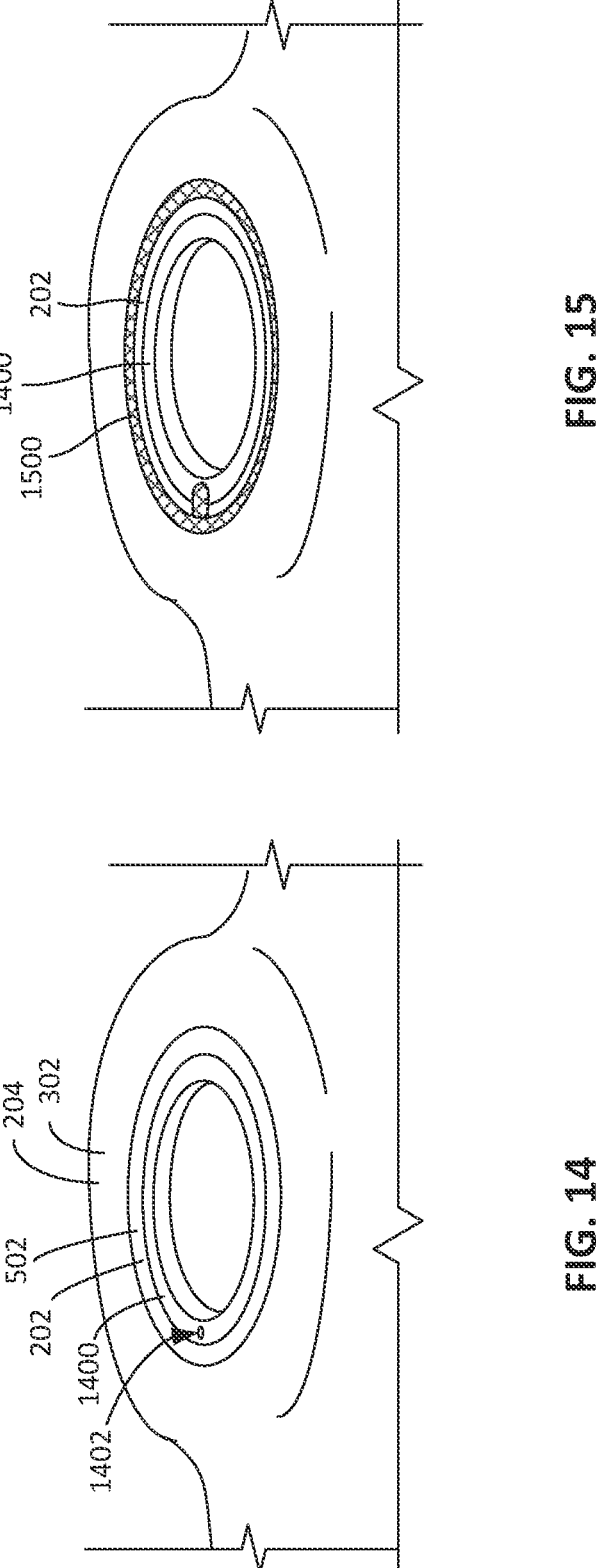
FIG. 14 is a perspective view of the bottom side of the example crown of FIG. 9 showing an example ring that can be inserted into the example steerer tube.
FIG. 15 shows an example weld formed by using the example ring of FIG. 14.

For example, FIG. 14 shows an example ring 1400 disposed in the steerer tube 202. The ring 1400 is aligned with the bottom end surface 502 of the steerer tube 202 and the bottom side 302 of the crown 204. In some examples, the ring 1400 is a washer or other disc-shaped block of material. The ring 1400 can be constructed of metal or another material. The ring 1400 can be constructed of the same type of material as the steerer tube 202 and/or the crown 204 or a different type of material as the steerer tube 202 and/or the crown 204. For example, the steerer tube 202, the crown 204, and the ring 1400 can each be constructed of a different material such as aluminum, steel, and stainless. In some examples, the ring 1400 is held in the steerer tube 202 via friction fit. In the illustrated example, the ring 1400 has a pilot hole 1402. To start the FSW process, the FSW tool 1000 with the probe 1002 is inserted into the pilot hole 1402 and then rotated up to the desired speed and temperature to start the intermixing process. Then, the FSW tool 1000 is moved radially outward to the joint between the steerer tube 202 and the crown 204 and the moved in a circular path around the joint. The FSW tool 1000 is then moved radially inward to the ring 1400 and then removed. FIG. 15 shows a resulting weld 1500 created by this path. The weld 1500 is at least partially formed on the ring 1400. In some examples after the FSW process, the ring 1400 is removed. For example, the ring 1400 can be cut from the steerer tube 202 and/or punched (e.g., using a punching tool) to break the weld 1500 and remove the ring 1400. In other examples, the ring 1400 is left in the steerer tube 202. The example ring 1400 can be used with any of the example joints disclosed herein.

Figure 16:
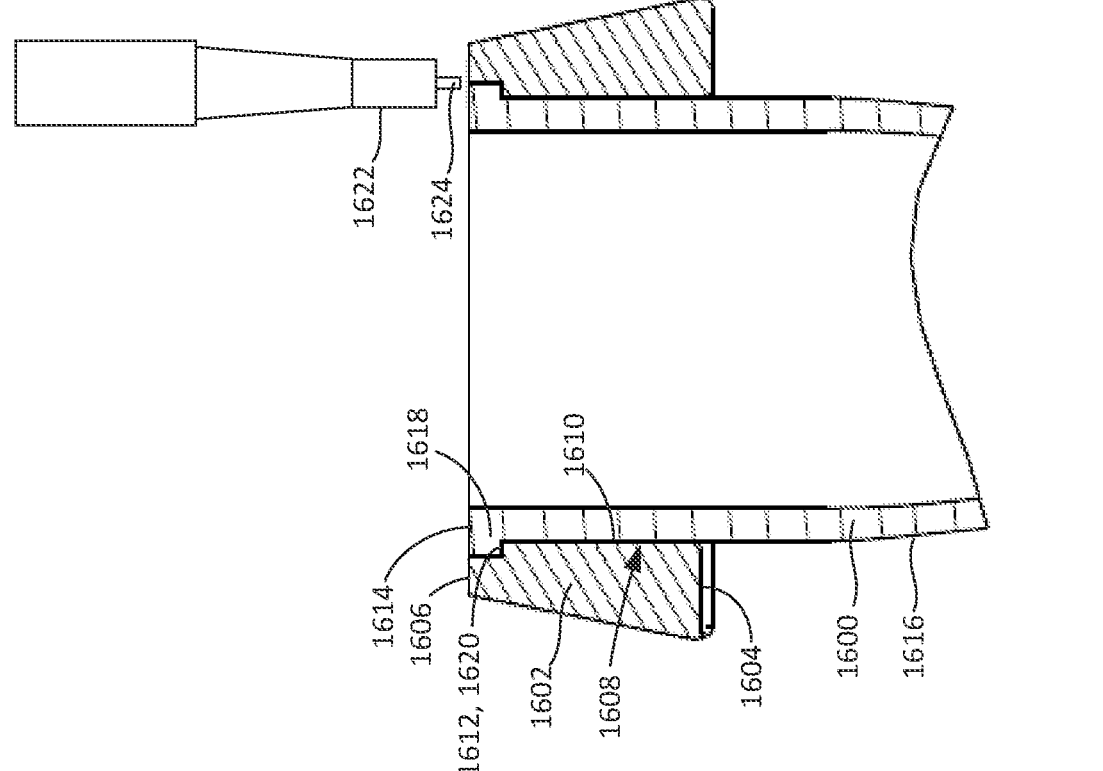
FIG. 16 is a cross-sectional view of an example flush mount joint between an example steerer tube and example crown that can be implemented on the example front fork of FIG. 2.

FIG. 16 is a cross-sectional view of another example joint that can be implemented between a steerer tube and a crown on the fork 108. FIG. 16 shows an example steerer tube 1600 and an example crown 1602. The cross-sectional view is similar to the cross-sectional view shown in FIGS. 9 and 10 (in an upside-down orientation). Any of the example structures and/or functions disclosed in connection with the steerer tube 202 and the crown 204 herein can likewise apply to the steerer tube 1600 and the crown 1602 of FIG. 16.

As shown in FIG. 16, the crown 1602 has a top side 1604 and a bottom side 1606 opposite the top side 1604. The crown 1602 defines a channel or opening 1608 extending between the top side 1604 and the bottom side 1606. The opening 1608 is defined by an inner surface 1610 of the crown 1602. In the illustrated example, the inner surface 1610 has a first shoulder 1612 near the bottom side 1606. The first shoulder 1612 is parallel to the bottom side 1606.

In the illustrated example, the steerer tube 1600 is disposed in the opening 1608 of the crown 1602. In this example, the steerer tube 1600 is inserted into the opening 1608 from the bottom side 1606 of the crown 1602. The steerer tube 1600 has a bottom end surface 1614 and an outer side surface 1616. In some examples, the steerer tube 1600 and the opening 1608 are dimensioned such that the outer side surface 1616 of the steerer tube 1600 and the inner surface 1610 of the crown 1602 are in contact. In some examples, the steerer tube 1600 and the opening 1608 are dimensioned to form a transition fit (sometimes referred to as a slip fit), which at least partially holds the steerer tube 1600 in the opening 1608 and couples the steerer tube 1600 and the crown 1602. In other examples, the steerer tube 1600 and the opening 1608 can be dimensioned to form a clearance fit.

In the illustrated example, the outer side surface 1616 of the steerer tube 1600 has a ridge or flange 1618 extending radially outward at the bottom end surface 1614. The flange 1618 forms a second shoulder 1620, which is parallel to the first shoulder 1612. The second shoulder 1620 is engaged with the first shoulder 1612. In the illustrated example, the distance between the first shoulder 1612 and the bottom side 1606 of the crown 1602 is the same as the distance between the second shoulder 1620 and the bottom end surface 1614 of the steerer tube 1600. As such, the bottom end surface 1614 of the steerer tube 1600 is aligned (e.g., flush) with the bottom side 1606 of the crown 1602. As disclosed in further detail herein, a weld can formed at the joint between these two surfaces to couple the steerer tube 1600 and the crown 1602. Therefore, in this example, the steerer tube 1600 and the crown 1602 are flush mounted.

Figure 17:
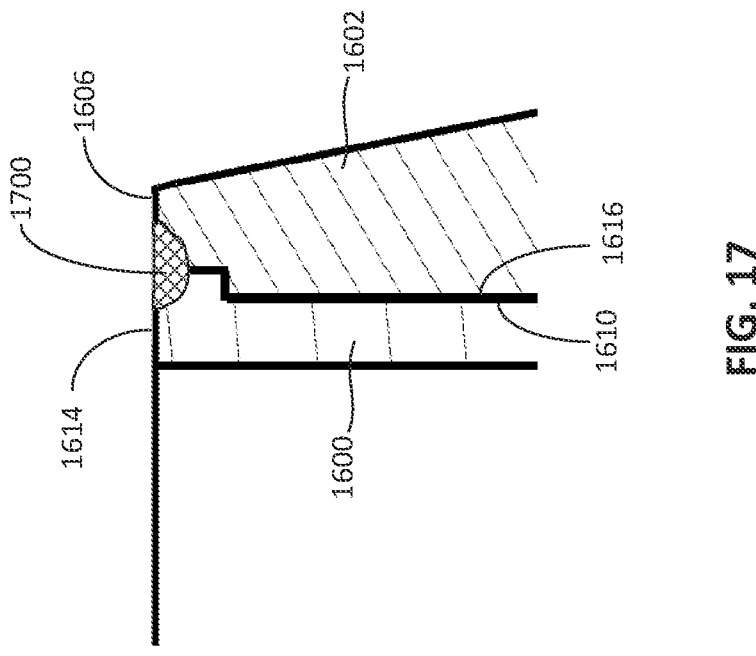
FIG. 17 shows an example weld formed at the example joint of FIG. 16 by the example friction stir welding tool.

The joint between the bottom end surface 1614 of the steerer tube 1600 and the bottom side 1606 of the crown 1602 can be welded using a solid-state welding process, such a friction stir welding process. For example, FIG. 16 shows an example FSW tool 1622 with an example probe 1624. Similar to the process disclosed above in connection with FIGS. 10 and 11, the probe 1624 is inserted into the joint and the FSW tool 1622 is moved in a circular path to form a weld at the joint. FIG. 17 shows an example weld 1700, which is formed at the joint between the bottom end surface 1614 of the steerer tube 1600 and the bottom side 1606 of the crown 1602 (and between the outer surface 1616 of the steerer tube 1600 and the inner surface 1610 of the crown 1602), thereby coupling the steerer tube 1600 and the crown 1602. In some examples, an additional component such as the ring 1400 can be used as a sacrificial component for starting and/or ending the FSW process.

Figure 18:
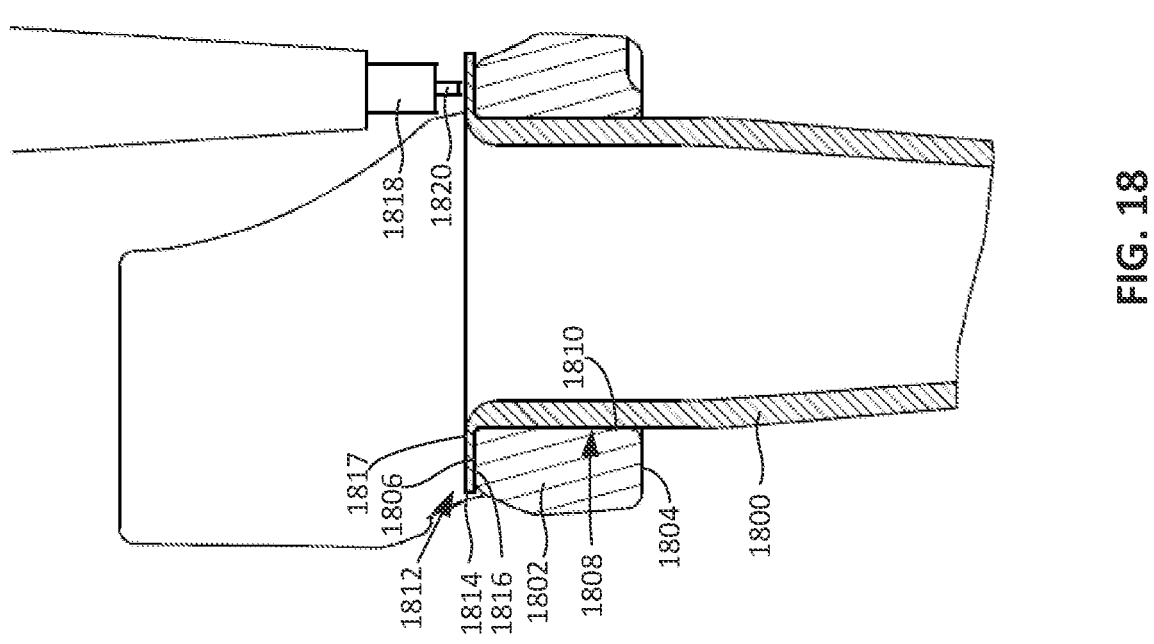
FIG. 18 is a cross-sectional view of an example surface mount joint between an example steerer tube and example crown that can be implemented on the example front fork of FIG. 2.

FIG. 18 is a cross-sectional view of another example joint that can be implemented between a steerer tube and a crown on the fork 108. FIG. 18 shows an example steerer tube 1800 and an example crown 1802. The cross-sectional view is similar to the cross-sectional view shown in FIGS. 9 and 10 (in an upside-down orientation). Any of the example structures and/or functions disclosed in connection with the steerer tube 202 and the crown 204 herein can likewise apply to the steerer tube 1800 and the crown 1802 of FIG. 18.

As shown in FIG. 18, the crown 1802 has a top side 1804 and a bottom side 1806 opposite the top side 1804. The crown 1802 defines a channel or opening 1808 extending between the top side 1804 and the bottom side 1806. The opening 1808 is defined by an inner surface 1810 of the crown 1802. The steerer tube 1800 is disposed in the opening 1808. In this example, the steerer tube 1800 extends through the opening 1808. In particular, the steerer tube 1800 has a portion 1812, referred to herein as an end portion 1812, that extends outward from the bottom side 1806 of the crown 1802. A weld can be formed between the end portion 1812 of the steerer tube 1800 and the bottom side 1806 of the crown 1802, as disclosed in further detail herein. In the illustrated example, the end portion 1812 of the steerer tube 1802 has or forms a flange 1814 that extends radially outward. The flange 1814 has an upward-facing surface 1816 and a bottom-facing surface 1817. The upward-facing surface 1816 is engaged with the bottom side 1806 of the crown 1802. Therefore, in this example, the steerer tube 1800 and the crown 1802 are surface mounted. In some examples, the flange 1814 is a portion of the steerer tube 1800 that has been bent or curved radially outward. Therefore, in some examples, the steerer tube 1800 is a single unitary part or component (e.g., a monolithic structure). In other examples, the flange 1814 can be a separate component that is coupled to the body of the steerer tube 1800.

In this example, the steerer tube 1800 is inserted into the opening 1808 from the bottom side 1806 of the crown 1802 until the flange 1814 engages the bottom side 1806 of the crown 1802. In some examples, the steerer tube 1800 and the opening 1808 are dimensioned to form a transition fit. In other examples, the steerer tube 1800 and the opening 1808 can be dimensioned to form a clearance fit.

The flange 1814 can be welded to the bottom side 1806 of the crown 1802 to couple the steerer tube 1800 and the crown 1802. For example, FIG. 18 shows an example FSW tool 1818 with an example probe 1820. When the FSW tool 1818 is moved toward the flange 1814, the probe 1820 pierces through the flange 1814 and into the bottom side 1806 of the crown 1802. The FSW tool 1818 can be moved in a circular path to weld the flange 1814 to the bottom side 1806 of the crown 1802 around the opening 1808.

Figure 19:
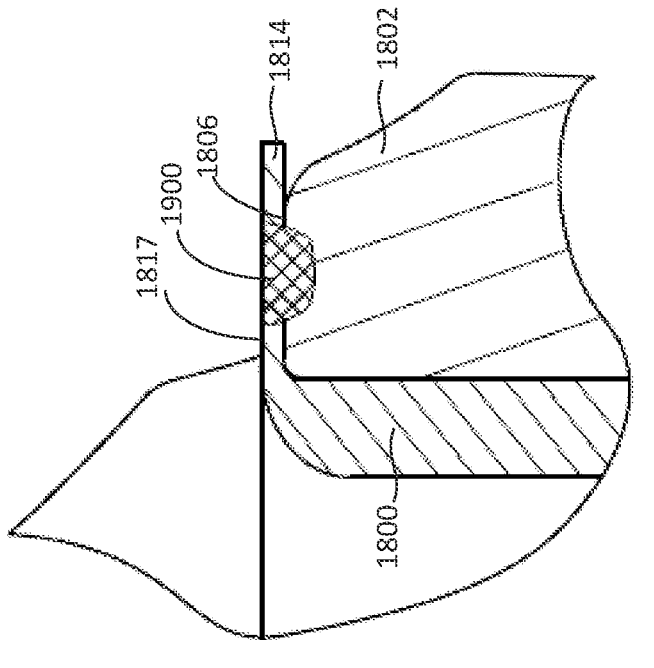
FIG. 19 shows an example weld formed at the example joint of FIG. 18 by the example friction stir welding tool.

FIG. 19 shows an example weld 1900 formed at the joint between the flange 1814 of the steerer tube 1800 and the bottom side 1806 of the crown 1802 by the FSW process. The weld 1900 extends through the flange 1814 and into the bottom side 1806 of the crown 1802. Therefore, in this example, the weld 1900 is at the bottom side 1806 of the crown 1802 outside of the opening 1808. In this example, the bottom-facing surface 1817 for the flange 1814 corresponds to a bottom end surface of the steerer tube 1800. Therefore, the bottom end surface of the steerer tube 1800 is welded to the crown 1802. In some examples, an additional component such as the ring 1400 can be used as a sacrificial component for starting and/or ending the FSW process.

Figure 20:
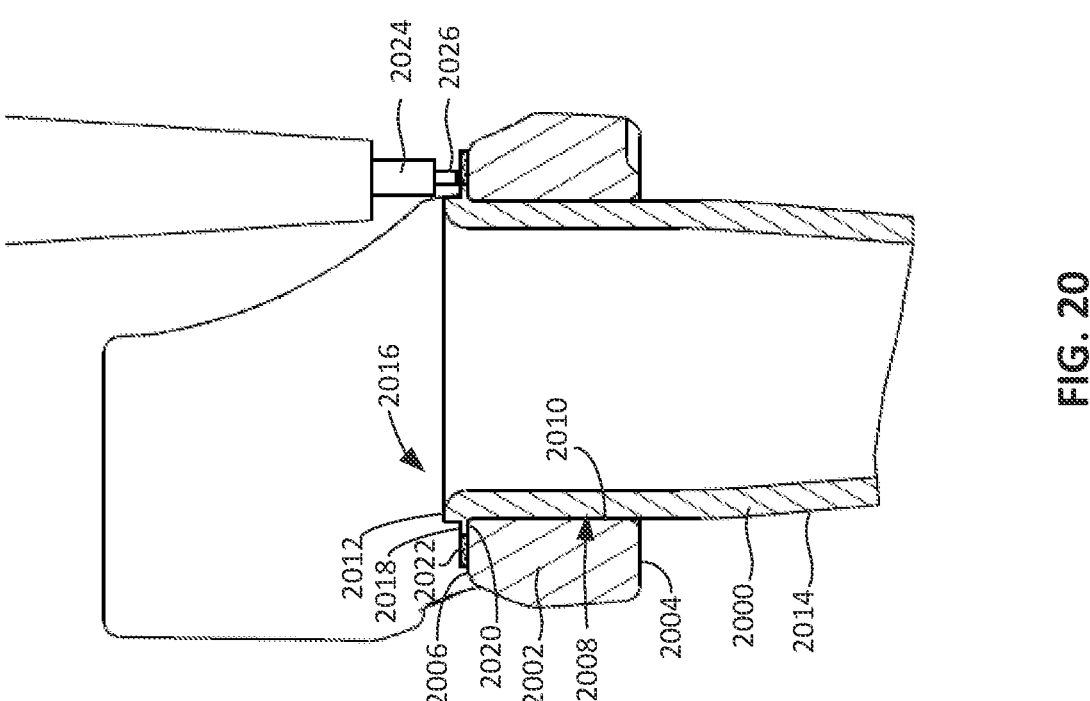
FIG. 20 is a cross-sectional view of an example surface mount joint between an example steerer tube and example crown that can be implemented on the example front fork of FIG. 2.

FIG. 20 is a cross-sectional view of another example joint that can be implemented between a steerer tube and a crown on the fork 108. FIG. 20 shows an example steerer tube 2000 and an example crown 2002. The cross-sectional view is similar to the cross-sectional view shown in FIGS. 9 and 10 (in an upside-down orientation). Any of the example structures and/or functions disclosed in connection with the steerer tube 202 and the crown 204 herein can likewise apply to the steerer tube 2000 and the crown 2002 of FIG. 20.

As shown in FIG. 20, the crown 2002 has a top side 2004 and a bottom side 2006 opposite the top side 2004. The crown 2002 defines a channel or opening 2008 extending between the top side 2004 and the bottom side 2006. The opening 2008 is defined by an inner surface 2010 of the crown 2002. The steerer tube 2000 is disposed in the opening 2008. The steerer tube 2000 has a bottom end surface 2012 and an outer side surface 2014. In this example, the steerer tube 2000 extends through the opening 2008. In particular, the steerer tube 2000 has a portion 2016, referred to herein as an end portion 2016, that extends outward from the bottom side 2006 of the crown 2002. A weld can be formed between the end portion 2016 of the steerer tube 2000 and the bottom side 2006 of the crown 2002, as disclosed in further detail herein. In the illustrated example, the end portion 2016 of the steerer tube 2000 has a flange 2018 that extends radially outward from the outer side surface 2014. In the illustrated example, the flange 2018 is distanced from the bottom end surface 2012 of the steerer tube 2000. The flange 2018 has an upward-facing surface 2020 engaged with the bottom side 2006 of the crown 2002. Therefore, in this example, the steerer tube 2000 and the crown 2002 are surface mounted. In this example, the steerer tube 2000 is inserted into the opening 2008 from the bottom side 2006 of the crown 2002 until the flange 2018 engages the bottom side 2006 of the crown 2002. In some examples, the steerer tube 2000 and the opening 2008 are dimensioned to form a transition fit. In other examples, the steerer tube 2000 and the opening 2002 can be dimensioned to form a clearance fit.

In some examples, a joining material member can be used to form a portion of the weld. For example, in FIG. 20, a joining material member 2022 is disposed around the flange 2018 on the bottom side 2006 of the crown 2002. In this example, the joining material member 2022 is implemented as a ring, referred to herein as the ring 2022. In some examples, the ring 2022 can be implemented as a washer or circlip. In other examples, the joining material member 2022 can be shaped differently. The ring 2022 can be constructed of metal or another material. The flange 2018 can be welded to the bottom side 2006 of the crown 2002 at the joint between the flange 2018 and the ring 2022. For example, FIG. 20 shows an example FSW tool 2024 with an example probe 2026. During the friction stir welding process, the probe 2026 pierces through the joint formed between the flange 2018 and the ring 2022 and into the bottom side 2006 of the crown 2002. The FSW tool 2024 can be moved in a circular path to weld the flange 2018 to the bottom side 2006 of the crown 2002 around the opening 2008.

Figure 21:
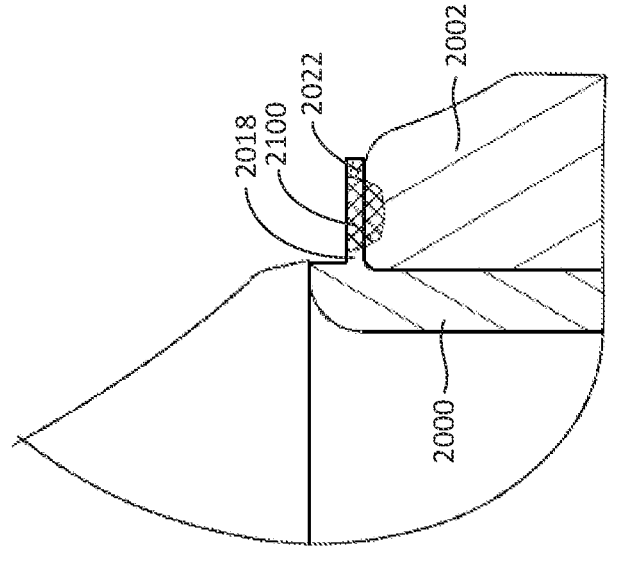
FIG. 21 shows an example weld formed at the example joint of FIG. 20 by the example friction stir welding tool.

FIG. 21 shows an example weld 2100 formed at the joint between the flange 2018, the ring 2022, and the bottom side 2006 of the crown 2002 by the example FSW process. Therefore, in this example, the weld 2100 is at the bottom side 2006 of the crown 2002. The weld is composed only of material from the steerer tube 2000, the crown 2002, and the ring 2022. The ring 2022 can be constructed of the same type of material as the steerer tube 2000 and/or the crown 2002 or constructed of a different type of material as the steerer tube 2000 and/or the crown 2002. For example, one of the steerer tube 2000, the crown 2002, and the ring 2022 can be constructed of aluminum, one of the steerer tube 2000, the crown 2002, and the ring 2022 can be constructed of steel, and one of the steerer tube 2000, the crown 2002, and the ring 2022 can be constructed of stainless steel. In some examples, using the ring 2022 enhances the structure of the weld 2100. For example, the ring 2022 can be composed of a material (which, as disclosed above, may be different than the material of the steerer tube 2000 and/or the crown 2002) that results in a relatively strong weld. Further, by using the ring 2022 to form a portion of the weld 2100, the flange 2018 on the steerer tube 2000 can be made shorter, which reduces manufacturing time and costs. This can also lead to easier and quicker assembly processes.

Figure 22:
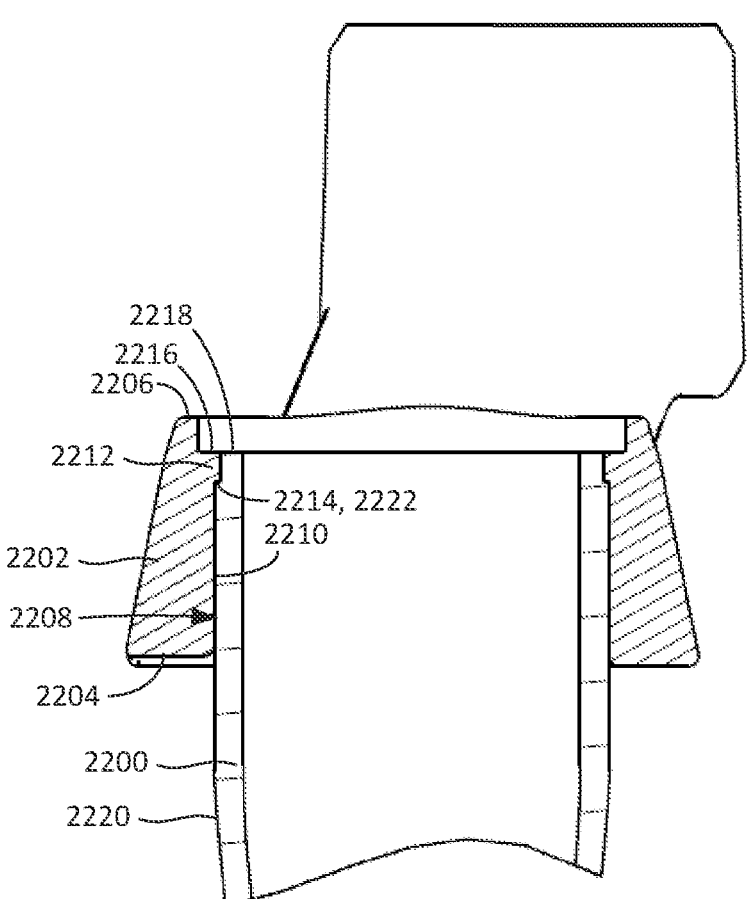
FIG. 22 is a cross-sectional view of an example joint between an example steerer tube and example crown that can be implemented on the example front fork of FIG. 2.

In some examples, the bottom of the steerer tube can be welded to the crown at a location that is near the bottom side of the crown but not on the bottom side of the crown. For example, FIG. 22 is a cross-sectional view of another example joint that can be implemented between a steerer tube and a crown on the fork 108. FIG. 22 shows an example steerer tube 2200 and an example crown 2202. The cross-sectional view is similar to the cross-sectional view shown in FIGS. 9 and 10 (in an upside-down orientation). Any of the example structures and/or functions disclosed in connection with the steerer tube 202 and the crown 204 herein can likewise apply to the steerer tube 2200 and the crown 2202 of FIG. 22.

In the illustrated example, the crown 2202 has a top side 2204 and a bottom side 2206 opposite the top side 2204. The crown 2202 defines a channel or opening 2208 extending between the top side 2204 and the bottom side 2206. The opening 2208 is defined by an inner surface 2210 of the crown 2202. The inner surface 2210 has a ridge 2212 that forms a first shoulder 2214 and a lower surface 2216. The lower surface 2216 is recessed or set back from the bottom side 2206 of the crown 2202. The steerer tube 2200 is disposed in the opening 2208. The steerer tube 2000 has a bottom end surface 2218 and an outer side surface 2220. The outer side surface 2220 has a second shoulder 2222 engaged with the first shoulder 2214. As such, the bottom end surface 2218 of the steerer tube 2200 is aligned with the lower surface 2216 of the crown 2202. The joint between the bottom end surface 2218 and the lower surface 2216 can be welded similar to the other joints disclosed herein. As such, the weld is formed at a joint that is within the opening 2208 between the top and bottom sides 2204, 2206 of the crown 2202. Therefore, in this example, the steerer tube 2200 is welded to the crown 2202 at a location that is near the bottom side 2206 but not on the bottom side 2206.

Figure 23:
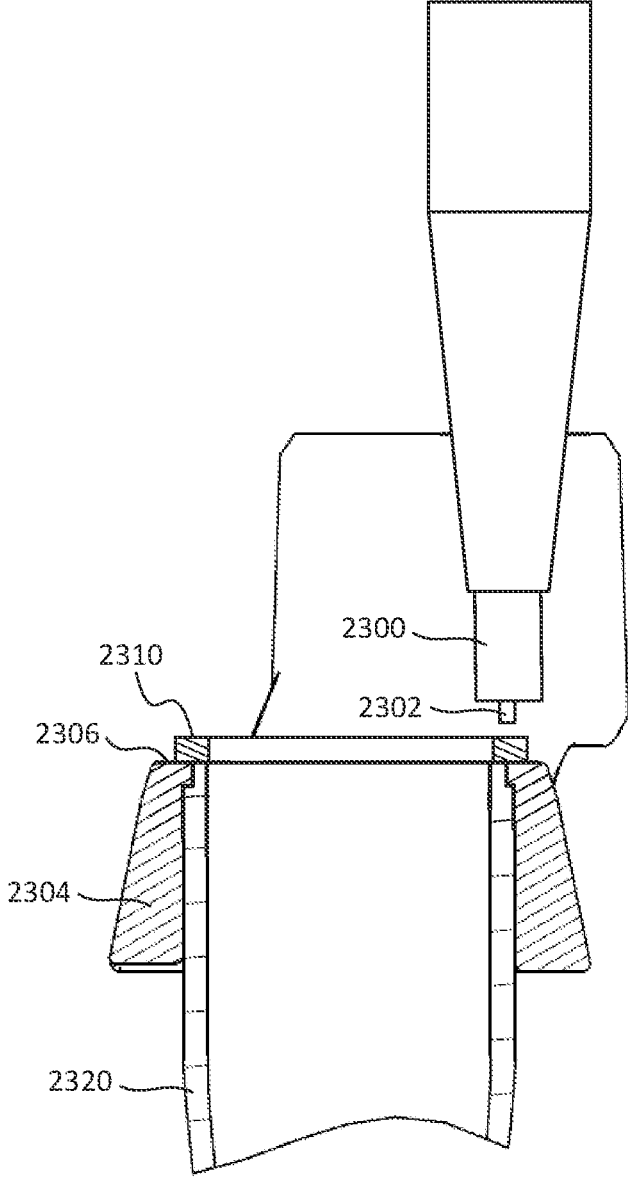
FIG. 23 is a cross-sectional view of an example joint between an example steerer tube and example crown that can be implemented on the example front fork of FIG. 2.

In some examples, a joining material member can be used to form a portion of the weld. For example, as illustrated in FIG. 23, a joining material member 2310 is disposed on the bottom side 2306 of the crown 2304. In this example, the joining material member 2310 is implemented as a ring. In some examples, the ring 2310 can be implemented as a washer or circlip. In other examples, the joining material member 2310 may be shaped differently. The ring 2310 may be constructed of metal or another material. In the illustrated embodiment, the ring 2310 is welded to the joint between the bottom side 2306 of the crown 2304 and the bottom side of the steerer tube 2320. FIG. 23 illustrates an example FSW tool 2300 with an example probe 2302. During the friction stir welding process, the probe 2302 pierces through the ring 2310 to the bottom side 2306 of the crown and the bottom side of the steerer tube 2320. The FSW tool 2300 can be moved in a circular path to weld the ring 2310 to the bottom side 2306 of the crown 2304 and/or steerer tube 2320.

Figure 24:
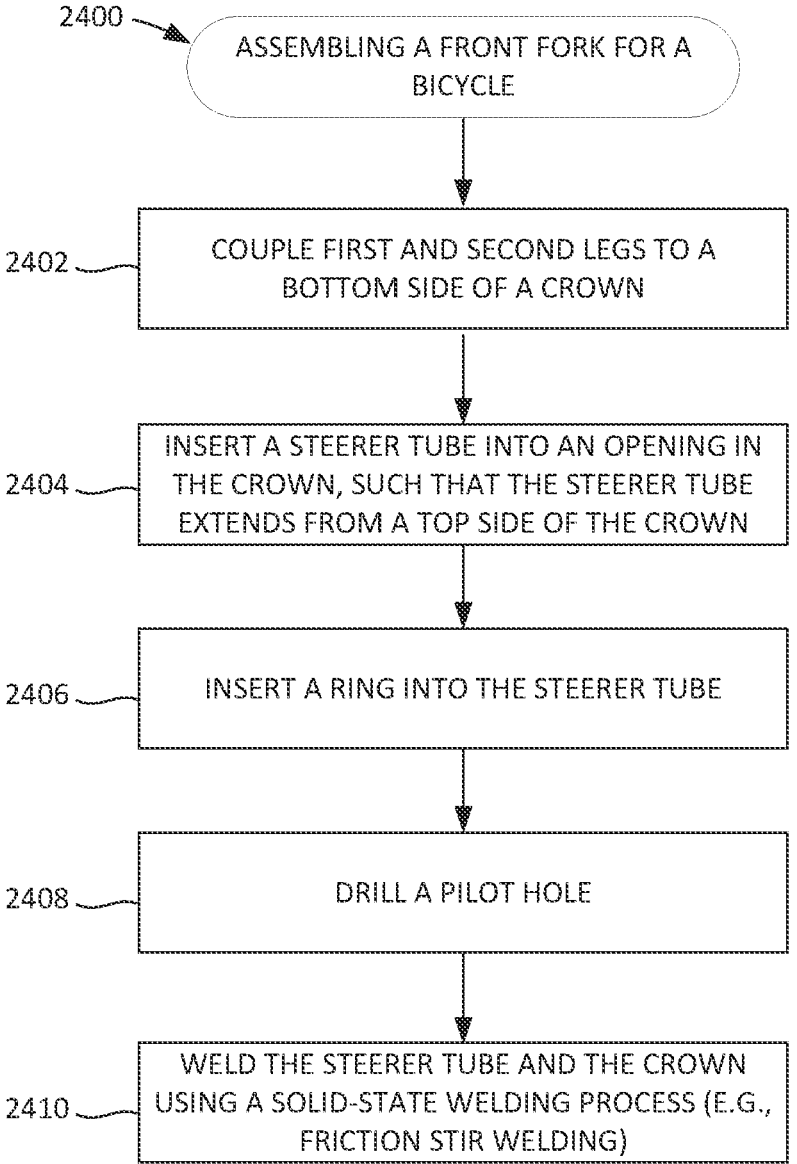
FIG. 24 is a flowchart representative of an example method of assembling a front fork using any of the example coupling techniques disclosed herein.

FIG. 24 is a flowchart representative of an example method of assembly a front fork for a bicycle, such as the front fork 200. Any of the example blocks of FIG. 24 can be repeated, removed, replaced, and/or rearranged. At block 2402, the method 2400 includes coupling first and second legs to a bottom side of a crown. For example, as shown in FIGS. 2-4, the first and second legs 206, 208 are coupled to and extend downward from the bottom side 302 of the crown 204. In some examples, the legs 206, 208 are inserted into the bores 400, 402 formed in the bottom side 302 of the crown 204. In some examples the legs 206, 208 are threadably coupled to the bores 400, 402. Additionally or alternatively, the legs 206, 208 can be coupled to the crown 204 via other techniques, such as press fit, welding, and/or threaded fasteners.

At block 2404, the method 2400 includes inserting a steerer tube into an opening in the crown. For example, the steerer tube 202 can be inserted into the opening 404 of the crown 202. In some examples, such as shown in the examples of FIGS. 9 and 22, the steerer tube is inserted into the opening from the top side of the crown. In other examples, such as shown in the examples of FIGS. 16, 18, and 20, the steerer tube is inserted into the opening from the bottom side of the crown. In some examples, the steerer tube is fit in the opening via a transition fit. This type of fit does not require the high pressing forces encountered during press fit that leads to deformations as seen in known assembly techniques.

In some examples, a component such as the ring 1400 can be used as a sacrificial component during the welding process. Therefore, at block 2406, the method 2400 includes inserting a ring into the steerer tube. At block 2408, the method 2400 includes drilling a pilot hole, such as the pilot hole 1402. The pilot hole can be drilled at the joint between the steerer tube and the crown. Alternatively, if the ring 1400 is used, the pilot hole can be drilled in the ring 1400.

At block 2410, the method 2400 includes welding the steerer tube and the crown using a solid-state welding process, such as friction stir welding. The welding process can be performed with a tool such as any of the example FSW tools 1000, 1622, 1818, 2024 disclosed herein. The tool can be moved in a path to form a weld along the joint between the steerer tube and the crown, thereby coupling the steerer tube and the crown. The path may be continuous or discontinuous. The path may be rounded, oval, involve straight paths or involve a combination thereof. In the illustrated embodiment the path is circular. Further, in an embodiment the tool may move in the path and provide a weld continuously along the path or the tool may provide a weld discontinuously along the path. Disclosed here are various joints that can be formed between the steerer tube and the crown and which can be welded via the solid-state welding process. In some examples, such as shown in FIGS. 9 and 16, the steerer tube and the crown form a flush mounted joint. In other examples, such as shown in FIGS. 18 and 20, the steerer tube and the crown form a surface mounted joint. In some examples, such as shown in the example of FIG. 20, an additional ring 2022 is disposed around the steerer tube and used to partially form the joint.

While the example welding techniques disclosed here are described in connection with a suspension form having telescoping legs for suspension, the example welding techniques disclosed herein also be used in connection with front forks that do not have telescoping legs. For example, road bicycles often have fixed front legs that do not telescope. Any of the example techniques disclosed herein can be similarly implement in connection with such forks to couple the steerer tube to the crown. Further, the examples disclosed herein can be used on forks that have only one leg or more than two legs.

From the foregoing, it will be appreciated that example methods and apparatus have been disclosed herein that reduce or eliminate the need to press fit a steerer tube and a crown of a front fork of a bicycle. This reduces or eliminates deformation and stresses induced in the crown and other components. As such, the examples disclosed herein enable easy, repeatable assembly of front forks that have better alignment and tolerances than known front forks.

Examples and example combinations disclosed herein include the following:

Example 1 is a front fork for a bicycle comprising a crown having a top side and a bottom side opposite the top side. The crown defines an opening between the top side and the bottom side. The front fork includes a first leg and a second leg coupled to and extending from the bottom side of the crown. The front fork also includes a steerer tube disposed in the opening of the crown and extending from the top side of the crown. The steerer tube and the crown are coupled by a weld at or near the bottom side of the crown.

Example 2 includes front fork of Example 1, wherein the weld is composed only of material from the steerer tube and material from the crown.

Example 3 includes the front fork of Examples 1 or 2, wherein the steerer tube has a bottom end surface that is aligned with the bottom side of the crown, and wherein the weld is formed at a joint between the bottom end surface of the steerer tube and the bottom side of the crown.

Example 4 includes the front fork of Example 3, wherein the opening is defined by an inner surface of the crown. The inner surface has a ridge extending radially inward at the bottom side. The ridge forms a first shoulder. The steerer tube has an outer side surface with a second shoulder. The second shoulder is engaged with the first shoulder.

Example 5 includes the front fork of Example 3, wherein the opening is defined by an inner surface of the crown. The inner surface has a first shoulder. The steerer tube has an outer side surface with a flange extending radially outward at the bottom end surface. The flange forms a second shoulder. The second shoulder is engaged with the first shoulder.

Example 6 includes the front fork of any of Examples 1-5, further including a ring disposed in the steerer tube and aligned with the bottom end surface of the steerer tube and the bottom side of the crown. The weld is at least partially formed on the ring.

Example 7 includes the front fork of any of Examples 1-3, wherein the steerer tube has an end portion that extends outward from the bottom side of the crown. The weld is formed between the end portion of the steerer tube and the bottom side of the crown.

Example 8 includes the front fork of Example 7, wherein the end portion of the steerer tube has a flange extending radially outward. The flange has an upward-facing surface engaged with the bottom side of the crown. The weld extends through the flange and into the bottom side of the crown.

Example 9 includes the front fork of Example 7, wherein the end portion of the steerer tube has a flange extending radially outward. The flange is engaged with the bottom side of the crown. The front fork further includes a ring disposed around the flange on the bottom side of the crown, and wherein the weld is formed at a joint between the flange of the steerer tube, the ring, and the bottom side of the crown.

Example 10 includes the front fork of Example 9, wherein, one of the steerer tube, the crown, and the ring is constructed of aluminum, one of the steerer tube, the crown, and the ring is constructed of steel, and one of the steerer tube, the crown, and the ring is constructed of stainless steel.

Example 11 includes the front fork of any of Examples 1-3, wherein the weld is at a joint formed between the steerer tube and the crown that is within the opening between the top side and the bottom side.

Example 12 includes the front fork of any of Examples 1-11, wherein the steerer tube and the opening are dimensioned to form a transition fit.

Example 13 is a front fork for a bicycle comprising: a crown having a top side, a bottom side opposite the top side, and an opening extending between the top side and the bottom side; one or more legs coupled to and extending from the bottom side of the crown; and a steerer tube disposed in the opening of the crown. The steerer tube has an end portion extending outward from the bottom side. The end portion is welded to the bottom side of the crown.

Example 14 includes the front fork of Example 13, wherein the end portion of the steerer tube has a flange extending radially outward. The flange has an upward-facing surface engaged with the bottom side of the crown. The weld extends through the flange and into the bottom side of the crown.

Example 15 includes the front fork of Examples 13 or 14, wherein the end portion of the steerer tube has a flange extending radially outward. The flange is engaged with the bottom side of the crown. The front fork further includes a ring disposed radially outward of the flange, and wherein the weld is formed at a joint between the flange of the steerer tube, the ring, and the bottom side of the crown.

Example 16 includes the front fork of Examples 13, 14, or 15, the weld is composed only of material from the steerer tube and material from the crown.

Example 17 is a method of assembling a front fork for a bicycle comprising: coupling first and second legs to a bottom side of a crown. The crown has a top side opposite the bottom side. The crown defines an opening between the top side and the bottom side. The method includes inserting a steerer tube into the opening in the crown and welding the steerer tube and the crown using a solid-state welding process.

Example 18 includes the method of Example 17, wherein the solid-state welding process is friction stir welding process.

Example 19 includes the method of Examples 17 or 18, wherein the steerer tube has a flange that engages the bottom side of the crown when the steerer tube is inserted into the opening in the crown, and wherein the solid-state welding process forms a weld that extends through the flange and into the bottom side of the crown.

Example 20 includes the method of Examples 17 or 18, wherein the steerer tube has a bottom end surface that is aligned with the bottom side of the crown, and wherein the solid-state welding process forms a weld at a joint between the bottom end surface of the steerer tube and the bottom side of the crown.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A front fork for a bicycle, the front fork comprising:
   a crown having a top side and a bottom side opposite the top side, the crown defining an opening between the top side and the bottom side;
   a first leg and a second leg coupled to and extending from the bottom side of the crown;
   a steerer tube disposed in the opening of the crown and extending from the top side of the crown, the steerer tube and the crown coupled by a weld at or near the bottom side of the crown; and
   at least one feature to align a bottom end surface of the steerer tube relative to the bottom side of the crown, wherein the weld is formed at a joint between the bottom end surface of the steerer tube and the bottom side of the crown.

2. The front fork of claim 1, wherein the weld is composed only of material from the steerer tube and material from the crown.

3. The front fork of claim 1, wherein the opening is defined by an inner surface of the crown, the inner surface having a ridge extending radially inward at the bottom side, the ridge forming a first shoulder, the steerer tube having an outer side surface with a second shoulder, the second shoulder engaged with the first shoulder.

4. The front fork of claim 1, wherein the opening is defined by an inner surface of the crown, the inner surface having a first shoulder, the steerer tube having an outer side surface with a flange extending radially outward at the bottom end surface, the flange forming a second shoulder, the second shoulder engaged with the first shoulder.

5. The front fork of claim 1, further including a ring disposed with the steerer tube and at the bottom end surface of the steerer tube and the bottom side of the crown, the weld at least partially formed on the ring.

6. The front fork of claim 1, wherein the steerer tube has an end portion that extends outward from the bottom side of the crown, the weld formed between the end portion of the steerer tube and the bottom side of the crown.

7. The front fork of claim 6, wherein the end portion of the steerer tube has a flange extending radially outward, the flange having an upward-facing surface engaged with the bottom side of the crown, the weld extending through flange and into the bottom side of the crown.

8. The front fork of claim 6, wherein the end portion of the steerer tube has a flange extending radially outward, the flange engaged with the bottom side of the crown, the front fork further including a ring disposed around the flange on the bottom side of the crown, and wherein the weld is formed at a joint between the flange of the steerer tube, the ring, and the bottom side of the crown.

19

20

9. The front fork of claim 8, wherein,
one of the steerer tube, the crown, and the ring is constructed of aluminum,
one of the steerer tube, the crown, and the ring is constructed of steel, and
one of the steerer tube, the crown, and the ring, is constructed of stainless steel.

10. The front fork of claim 1, wherein the weld is at a joint formed between the steerer tube and the crown that is within the opening between the top side and the bottom side.

11. The front fork of claim 1, wherein the steerer tube and the opening are dimensioned to form a transition fit.

12. A front fork for a bicycle, the front fork comprising:
a crown having a top side, a bottom side opposite the top side, and an opening extending between the top side and the bottom side;
one or more legs coupled to and extending from the bottom side of the crown;
a steerer tube disposed in the opening of the crown, the steerer tube having an end portion extending outward from the bottom side, the end portion welded to the bottom side of the crown; and
at least one feature to align the end portion of the steerer tube relative to the bottom side of the crown.

13. The front fork of claim 12, wherein the end portion of the steerer tube has a flange extending radially outward, the flange having an upward-facing surface engaged with the bottom side of the crown, the weld extending through the flange and into the bottom side of the crown.

14. The front fork of claim 12, wherein the end portion of the steerer tube has a flange extending radially outward, the flange engaged with the bottom side of the crown, the front fork further including a ring disposed radially outward of the flange, and wherein the weld is formed at a joint between the flange of the steerer tube, the ring, and the bottom side of the crown.

15. The front fork of claim 12, the weld is composed only of material from the steerer tube and material from the crown.

16. The front fork of claim 1, wherein the bottom end surface of the steerer tube is flush with the bottom side of the crown.

17. A method of assembling a front fork for a bicycle, comprising:
coupling first and second legs to a bottom side of a crown, the crown having a top side opposite the bottom side, the crown defining an opening between the top side and the bottom side;
inserting a steerer tube into the opening in the crown;
aligning, with at least one alignment feature, a bottom end surface of the steerer tube relative to the bottom side of the crown; and
welding the steerer tube and the crown using a solid-state welding process.

18. The method of claim 17, wherein the solid-state welding process is friction stir welding process.

19. The method of claim 17, wherein the steerer tube has a flange that engages the bottom side of the crown when the steerer tube is inserted into the opening in the crown, and wherein the solid-state welding process forms a weld that extends through the flange and into the bottom side of the crown.

20. The method of claim 17, wherein the steerer tube has a bottom end surface that is aligned with the bottom side of the crown, and wherein the solid-state welding process forms a weld at a joint between the bottom end surface of the steerer tube and the bottom side of the crown.

* * * * *